United States Patent [19]
Turkevich et al.

[11] Patent Number: 5,998,023
[45] Date of Patent: Dec. 7, 1999

[54] SURFACE MODIFICATION OF HYDROPHOBIC POLYMER SUBSTRATE

[75] Inventors: Leonid Anthony Turkevich, Alpharetta; David Lewis Myers, Cumming; Gunilla Elsa Gillberg-LaForce, Roswell, all of Ga.

[73] Assignee: Kimberly-Clark Worldwide, Inc., Neenah, Wis.

[21] Appl. No.: 09/005,399

[22] Filed: Jan. 9, 1998

Related U.S. Application Data

[62] Division of application No. 08/658,333, Jun. 5, 1996, Pat. No. 5,733,603.

[51] Int. Cl.$^6$ .............................. B32B 27/02; B32B 27/32
[52] U.S. Cl. ......................... 428/361; 428/365; 428/375; 428/378; 428/394; 428/396
[58] Field of Search .................................. 427/422, 516, 427/518; 428/361, 365, 375, 378, 394, 396

[56] References Cited

U.S. PATENT DOCUMENTS

| | | | |
|---|---|---|---|
| 2,436,144 | 2/1948 | Howk et al. ............................. | 260/87 |
| 3,016,599 | 1/1962 | Perry, Jr. ............................... | 28/78 |
| 3,050,418 | 8/1962 | Mendelsohn et al. ................ | 117/118 |
| 3,341,394 | 9/1967 | Kinney ................................... | 161/72 |
| 3,548,408 | 12/1970 | Worrall ................................. | 260/87.3 |
| 3,560,318 | 2/1971 | Miller et al. .......................... | 161/82 |
| 3,655,862 | 4/1972 | Dorschner et al. ................... | 264/290 |
| 3,692,618 | 9/1972 | Dorschner et al. ................... | 161/72 |
| 3,704,198 | 11/1972 | Prentice ................................. | 161/148 |
| 3,705,068 | 12/1972 | Dobo et al. ........................... | 156/441 |
| 3,755,527 | 8/1973 | Keller et al. .......................... | 264/210 |
| 3,802,817 | 4/1974 | Matsuki et al. ....................... | 425/66 |
| 3,808,165 | 4/1974 | Duchane ................................ | 260/29.6 |
| 3,849,241 | 11/1974 | Butin et al. ........................... | 161/169 |
| 3,853,651 | 12/1974 | Porte ..................................... | 156/73.6 |
| 3,973,068 | 8/1976 | Weber ................................... | 428/198 |
| 3,978,185 | 8/1976 | Butin et al. ........................... | 264/93 |
| 4,002,796 | 1/1977 | Baldi et al. ........................... | 428/375 |
| 4,007,152 | 2/1977 | Kosaka et al. ........................ | 260/31.6 |
| 4,064,605 | 12/1977 | Akiyama et al. ...................... | 28/103 |
| 4,070,218 | 1/1978 | Weber ................................... | 156/167 |
| 4,091,140 | 5/1978 | Harmon ................................. | 428/288 |
| 4,100,319 | 7/1978 | Schwartz ............................... | 428/171 |
| 4,100,324 | 7/1978 | Anderson et al. ..................... | 428/288 |
| 4,118,531 | 10/1978 | Hauser ................................... | 428/224 |
| 4,152,317 | 5/1979 | Agouri et al. ......................... | 260/42.46 |
| 4,234,655 | 11/1980 | Kunimune et al. ................... | 428/374 |
| 4,323,626 | 4/1982 | Kunimune et al. ................... | 428/374 |
| 4,340,563 | 7/1982 | Appel et al. .......................... | 264/518 |
| 4,405,297 | 9/1983 | Appel et al. .......................... | 425/72 |
| 4,434,204 | 2/1984 | Hartman et al. ...................... | 428/198 |
| 4,510,185 | 4/1985 | Chiolle et al. ........................ | 427/222 |
| 4,578,414 | 3/1986 | Sawyer et al. ........................ | 524/310 |
| 4,627,811 | 12/1986 | Greiser et al. ........................ | 425/72 S |
| 4,644,045 | 2/1987 | Fowels .................................. | 526/348 |
| 4,663,220 | 5/1987 | Wisneski et al. ..................... | 428/22 |
| 4,672,005 | 6/1987 | Dyer ...................................... | 428/474.4 |
| 4,696,037 | 9/1987 | Ofstead ................................. | 524/557 |
| 4,696,388 | 9/1987 | Ohmura et al. ....................... | 525/88 |
| 4,781,978 | 11/1988 | Duan . | |
| 4,966,808 | 10/1990 | Kawano ................................ | 428/225 |
| 5,049,275 | 9/1991 | Gillberg-La Force . | |
| 5,304,420 | 4/1994 | Hirakawa et al. .................... | 428/373 |
| 5,340,650 | 8/1994 | Hirakawa et al. .................... | 428/373 |
| 5,354,587 | 10/1994 | Abayasekara ........................ | 428/36.6 |
| 5,367,015 | 11/1994 | Gutweiler et al. ................... | 524/557 |
| 5,405,698 | 4/1995 | Dugan ................................... | 428/373 |
| 5,420,180 | 5/1995 | Kayayama et al. .................. | 428/375 |
| 5,443,727 | 8/1995 | Gagnon . | |

FOREIGN PATENT DOCUMENTS

| | | |
|---|---|---|
| 2908805 | 9/1979 | Germany . |
| 5-1038522 | 3/1976 | Japan . |
| 5-1038523 | 3/1976 | Japan . |
| 6-3105112 | 5/1988 | Japan . |
| 3130415 | 6/1991 | Japan . |

OTHER PUBLICATIONS

"Superfine Thermoplastic Fibers" by V. A. Wente, Industrial and Engineering Chemistry, vol. 48, No. 8, pp. 1342–1346 (1956).

"Manufacture of Superfine Organic Fibers", by V. A. Wente et al., Navy Research Laboratory, Washington, D.C., NRL Report 4364 (111437), May 25, 1994, US Dept. of Commerce, Office of Technical Services.

"Melt Blowing—A One–Step Web Process for New Nonwoven Products" by R. R. Butin et al., Journal of the Technical Association of the Pulp and Paper Industry, vol. 56, No. 4, pp. 74–77 (1973).

*Primary Examiner*—Erma Cameron
*Attorney, Agent, or Firm*—William E. Maycock

[57] ABSTRACT

A method for coating the surface of a substrate composed of a hydrophobic polymer with a hydrophobic vinyl polymer. The method includes preparing a solution of the hydrophobic vinyl polymer in a polar nonaqueous solvent, such as 1-methyl-1-pyrrolidinone, in which the hydrophobic vinyl polymer is surface-active. The substrate then is treated with the solution under conditions sufficient to deposit the hydrophobic vinyl polymer on the substrate. The hydrophobic vinyl polymer may have readily hydrolyzable pendant groups which, upon hydrolysis thereof in an aqueous medium, will result in the formation of a hydrophilic vinyl polymer coating on the substrate. For example, the hydrophobic vinyl polymer may be poly(vinyl trifluoroacetate). Also provided are coated substrates, in which the substrate is a shaped article composed of a hydrophobic polymer. The shaped article may be, for example, a film, fiber, or nonwoven web.

12 Claims, No Drawings

SURFACE MODIFICATION OF HYDROPHOBIC POLYMER SUBSTRATE

This application is a division of application Ser. No. 08/658,333 now U.S. Pat. No. 5,733,603 entitled "SURFACE MODIFICATION OF HYDROPHOBIC POLYMER SUBSTRATE" and filed in the U.S. Patent and Trademark Office on Jun. 5, 1996. The entirety of that application is hereby incorporated by reference.

BACKGROUND OF THE INVENTION

The present invention relates to the surface modification of shaped objects composed, in whole or in part, of hydrophobic polymers.

Polymers are used widely throughout the world to make a variety of products which include blown and cast films, extruded sheets, injection molded articles, foams, blow molded articles, extruded pipe, monofilaments, and nonwoven webs. Some of such polymers, such as polyolefins, are naturally hydrophobic, and for many uses this property is either a positive attribute or at least not a disadvantage.

There are a number of uses for hydrophobic polymers, however, where their hydrophobic nature either limits their usefulness or requires some effort to modify the surface characteristics of the shaped articles made therefrom. By way of example, polyolefins are used to manufacture nonwoven webs which are employed in the construction of such disposable absorbent articles as diapers, feminine care products, incontinence products, and the like. Frequently, such nonwoven webs need to be wettable. Wettability can be obtained by spraying or coating the web with a surfactant solution during or after its formation and then drying the web. However, surfactant which remains on the web is removed upon exposure of the web to aqueous media. Alternatively, a surfactant can be included in the polymer which is to be melt-processed, as disclosed in U.S. Pat. Nos. 3,973,068 and 4,070,218 to R. E. Weber. In that case, however, the surfactant must be forced to the surface of the fibers from which the web is formed. This typically is done by heating the web on a series of steam-heated rolls or "hot cans". This process, called "blooming", is expensive and still has the disadvantage of ready removal of the surfactant by aqueous media. Moreover, the surfactant has a tendency to migrate back into the fiber which adversely affects shelf life, particularly at high storage temperatures. In addition, it is not possible to incorporate in the polymer levels of surfactant much above 1 percent by weight because of severe processability problems; surfactant levels at the surface appear to be limited to a maximum of about 0.33 percent by weight. Most importantly, the blooming process results in web shrinkage in the cross-machine direction and a significant loss in web tensile strength.

Other methods of imparting wettability to, or otherwise affecting the surface characteristics of, shaped articles made from polyolefins and other hydrophobic polymers are known. For example, an alkoxylated alkyl phenol in combination with a mixed mono-, di-, and/or triglyceride and/or a polyoxyalkylene fatty acid ester have been incorporated in a polyolefin resin and the resulting composition utilized to form wettable olefin polymer fibers (U.S. Pat. No. 4,578,414 to Sawyer and Knight). As another example, a substrate has been contacted with an aqueous mixture containing a water-soluble vinyl monomer and a hydrophobic vinyl monomer. Polymerization of the water-soluble vinyl monomer then was initiated by a polymerization initiator, thereby forming a vinyl polymer on the surface of the polymer substrate (U.S. Pat. No. 4,672,005 to Dyer). As a further example, the surface of a polymer material has been modified by means of a block copolymer. The block copolymer consists of a hydrophilic polymer portion formed from a vinyl monomer and a polymer portion which is compatible with the polymer material, also formed from a vinyl monomer (U.S. Pat. No. 4,698,388 to Ohmura et al.).

Poly(vinyl alcohol) has interesting physical and chemical properties which are associated with its affinity for water. Crosslinked and noncrosslinked hydrogels of the polymer are used in numerous devices such as contact lenses (U.S. Pat. No. 4,695,037), composite glass (U.S. Pat. No. 5,367,015), and synthetic papers (U.S. Pat. Nos. 3,560,318; 4,002,796; 4,152,317; and 4,510.185). Coatings of poly(vinyl alcohol) are described in the patent literature as being formed by deposition of aqueous emulsions of the polymer on hydrophobic substrates which most typically are fibrils of high density polyethylene for use in synthetic paper (U.S. Pat. Nos. 3,560,318; 4,002,796; 4,152,317; and 4,510.185). In addition, the surface modification of polyamides has been described, wherein poly(vinyl alcohol) has been partially esterified with polycarboxylic acids. The partially esterified material is bound to the polyamide surface via free carboxylate functionalities and reactive groups on the polyamide surface (U.S. Pat. No. 3,050,418). A composite material formed from poly(vinyl alcohol), a modified starch, and water-soluble cellulose has found utility as an aqueous-based size for cotton and cotton/polyester yarns (U.S. Pat. No. 5,420,180).

The fluorination of vinyl monomers and the polymerization of these monomers to form fluoropolymers has been described in U.S. Pat. No. 2,436,144 to Howk and Jacobson. The patent describes a method for preparing vinyl trifluoroacetate. The patent also describes the polymerization of the monomer to form a tough, nonflammable, and thermoformable polymer which they named poly(vinyl trifluoroacetate).

Poly(vinyl alcohol) cannot be made by polymerization of vinyl alcohol. Vinyl alcohol is the enol of acetaldehyde, and as such exists in equilibrium with its aldehydic tautomer. Poly(vinyl alcohol) typically is synthesized by the hydrolysis or solvolysis of other vinyl polymers having pendant groups which will yield the alcohol and an appropriate leaving group. Examples of polymers used in the preparation of poly(vinyl alcohol) include, by way of illustration only, poly(vinyl acetate), poly(vinyl t-butyl ether), and poly(vinyl acetal). Due to the commercial importance of poly(vinyl alcohol) as a yarn sizing and stabilizer for aqueous emulsions and dispersions, the nonaqueous solution chemistry of the polymer and its esters has been largely ignored. Aside from mentioning that poly(vinyl trifluoroacetate) was readily soluble in N,N-di-methylformamide, U.S. Pat. No. 2,436,144 does not explore the properties of nonaqueous poly(vinyl trifluoroacetate) solutions.

There is, therefore, a need for methodology which will permit the uniform coating of hydrophobic polymer surfaces with a poly(vinyl alcohol) in order to render such surfaces hydrophilic. There also is a need for methodology which will permit the uniform coating of hydrophobic polymer surfaces with a hydrophobic vinyl polymer in order to alter the surface characteristics of the hydrophobic polymer.

SUMMARY OF THE INVENTION

The nonaqueous solution behavior of a hydrophobic vinyl polymer, such as poly(vinyl trifluoroacetate), forms the unique basis of the present invention. It has been unexpectedly discovered that a hydrophobic vinyl polymer may be a surface-active agent in a polar nonaqueous solution, in which case it may be deposited as a strongly bound surface coating on a hydrophobic polymer substrate.

If the hydrophobic vinyl polymer has readily hydrolyzable pendant groups, such groups may be hydrolyzed under mild conditions after deposition of the hydrophobic vinyl polymer on the substrate. The hydrolysis reaction is rapid and appears to be complete, based on surface analysis of treated surfaces. Thus, hydrophobic surfaces treated according to the teachings herein may be rendered hydrophilic. The degree of hydrophilicity is determined by the conditions used for coating deposition and hydrolysis.

Hence, the present invention addresses some of the difficulties and problems discussed above by providing a method for the deposition on a substrate composed of a hydrophobic polymer of a polymeric coating from a polar nonaqueous solution. The polymeric coating is composed of a hydrophobic vinyl polymer. The hydrophobic vinyl polymer also is surface active in the polar nonaqueous solution.

The method includes preparing a solution of the hydrophobic vinyl polymer in a polar nonaqueous solvent in which the hydrophobic vinyl polymer is surface active. The substrate then is treated with the solution under conditions sufficient to deposit the hydrophobic vinyl polymer on the substrate. The treated substrate may be dried and/or rinsed with a polar nonaqueous solvent.

Desirably, the substrate will be treated at a temperature of from about 50° C. to the boiling point of the polar nonaqueous solvent. For example, the substrate may be treated at a temperature which is above the softening point of the hydrophobic polymer.

In general, the substrate may be of any shape or size. For example, the substrate may be a film, fiber, or nonwoven web. As another example, the hydrophobic polymer may be a polyolefin, such as, by way of illustration only, polyethylene or polypropylene.

The present invention also provides a method for coating the surface of a substrate composed of a hydrophobic polymer with a hydrophilic vinyl polymer. The method involves dissolving a hydrophobic vinyl polymer having readily hydrolyzable pendant groups in a polar nonaqueous solvent in which the hydrophobic vinyl polymer is surface-active. The readily hydrolyzable pendant groups are adapted to result in the formation of a hydrophilic vinyl polymer upon hydrolysis thereof. The substrate is treated with the solution under conditions sufficient to deposit the hydrophobic vinyl polymer on the hydrophobic polymer substrate. The treated substrate is removed from the solution and the pendant groups on the hydrophobic vinyl polymer deposited on the surface of the hydrophobic polymer substrate are hydrolyzed in an aqueous medium to give the hydrophilic vinyl polymer.

The treated substrate may be dried prior to hydrolyzing the pendant groups. The treated substrate also may be rinsed with a polar nonaqueous solvent either before or after drying the treated substrate and prior to hydrolyzing the pendant groups.

Desirably, either or both of the treating and hydrolyzing steps will be carried out at a temperature of from about 50° C. to the boiling point of the polar nonaqueous solvent. More desirably, either or both of the treating and hydrolyzing steps will be carried out at a temperature which is above the softening point of the hydrophobic polymer. In some embodiments, the hydrophobic vinyl polymer having readily hydrolyzable pendant groups will be poly(vinyl trifluoroacetate) and the polar aqueous solvent will be 1-methyl-2-pyrrolidinone.

In a variation of the above method, the hydrophobic vinyl polymer may have both readily hydrolyzable pendant groups and pendant hydroxy or carboxy groups, provided that such polymer is surface active in a polar nonaqueous solvent. A hydrophobic polymer substrate may be coated with such polymer and the coating crosslinked by means of the free hydroxy or carboxy groups by known means. The crosslinked coating then may be hydrolyzed to provide a hydrophilic vinyl polymer coating on the substrate.

The present invention further provides a coated substrate which is composed of a hydrophobic polymer. The substrate has on the surface thereof a uniform coating of a hydrophobic vinyl polymer. In some embodiments, the hydrophobic vinyl polymer may have readily hydrolyzable pendant groups. For example, the hydrophobic vinyl polymer may be poly(vinyl trifluoroacetate).

The present invention additionally provides a coated substrate which is composed of a hydrophobic polymer. The substrate has on the surface thereof a uniform coating of a hydrophilic vinyl polymer. For example, the hydrophilic vinyl polymer may be poly(vinyl alcohol).

Also provided by the present invention is a coated substrate prepared by either of the methods of the present invention described above.

The coating of a hydrophobic vinyl polymer on a substrate composed of a hydrophobic polymer is useful for changing the surface characteristics of the substrate without effecting bulk properties. For example, such a coating may provide a reduced adsorption of protein on the surface of the substrate. As another example, the coating may render the surface chemical or alcohol repellent. As yet another example, the coating may be coverted, by hydrolysis of readily hydrolyzable pendant groups on the hydrophobic vinyl polymer of which the coating is composed, to a hydrophilic vinyl polymer coating, thereby rendering the surface of the substrate wettable by water.

DETAILED DESCRIPTION OF THE INVENTION

As used herein, the term "substrate" means any shaped article formed, in whole or in part, of a hydrophobic polymer. Thus, the substrate may be of any shape or size. For example, the substrate may be a film, fiber, or nonwoven web. Fibers and nonwoven webs are particularly desired substrates.

Hydrophobic polymer fibers generally may be prepared by any known means. As a practical matter, however, the fibers will be prepared by a melt-extrusion process and formed into a nonwoven web. The term "melt-extrusion process" as applied to a nonwoven web is meant to include a nonwoven web prepared by any melt-extrusion process for forming a nonwoven web in which melt-extrusion to form fibers is followed concurrently by web formation on a foraminous support. The term includes, among others, such well-known processes as meltblowing, coforming, spunbonding, and the like. By way of illustration only, such processes are exemplified by the following references:

(a) meltblowing references include, by way of example, U.S. Patent Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A.

Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references include U.S. Pat. Nos. 4,100,324 to R. A. Anderson et al. and 4,118,531 to E. R. Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

Other methods for preparing nonwoven webs are, of course, known and may be employed. Such methods include air laying, wet laying, carding and bonding, and the like. Moreover, the hydrophobic polymer fibers may be in the form of continuous filaments or as woven or knitted fabrics prepared from such continuous filaments.

The term "hydrophobic polymer" is used herein to mean any polymer resistant to wetting, or not readily wet, by water, i.e., having a lack of affinity for water. A hydrophobic polymer typically will have a water contact angle approximately equal to or greater than 90°. Examples of hydrophobic polymers include, by way of illustration only, polyolefins, such as polyethylene, poly(isobutene), poly(isoprene), poly(4-methyl-1-pentene), polypropylene, ethylene-propylene copolymers, ethylene-propylene-hexadiene copolymers, and ethylene-vinyl acetate copolymers; styrene polymers, such as poly(styrene), poly(2-methylstyrene), styrene-acrylonitrile copolymers having less than about 20 mole-percent acrylonitrile, and styrene-2,2,3,3,-tetrafluoropropyl methacrylate copolymers; halogenated hydrocarbon polymers, such as poly(chlorotrifluoroethylene), chlorotrifluoroethylene-tetrafluoroethylene copolymers, poly(hexafluoropropylene), poly(tetrafluoroethylene), tetrafluoroethylene-ethylene copolymers, poly(trifluoroethylene), poly(vinyl fluoride), and poly(vinylidene fluoride); vinyl polymers, such as poly(vinyl butyrate), poly(vinyl decanoate), poly(vinyl dodecanoate), poly(vinyl hexadecanoate), poly(vinyl hexanoate), poly(vinyl propionate), poly(vinyl octanoate), poly(heptafluoroisopropoxyethylene), poly(heptafluoroisopropoxypropylene), and poly(methacrylonitrile); acrylic polymers, such as poly(n-butyl acetate), poly(ethyl acrylate), poly[(1-chlorodifluoromethyl) tetrafluoroethyl acrylate], poly[di(chlorofluoromethyl) fluoromethyl acrylate], poly(1,1-dihydroheptafluorobutyl acrylate), poly(1,1-dihydropentafluoroisopropyl acrylate), poly(1,1-dihydropentadecafluorooctyl acrylate), poly(heptafluoroisopropyl acrylate), poly[5-(heptafluoroisopropoxy)pentyl acrylate], poly[11-(heptafluoroisopropoxy)undecyl acrylate], poly[2-(heptafluoroisopropoxy)ethyl acrylate], and poly(nonafluoroisobutyl acrylate); methacrylic polymers, such as poly(benzyl methacrylate), poly(n-butyl methacrylate), poly(isobutyl methacrylate), poly(t-butyl methacrylate), poly(t-butylaminoethyl methacrylate), poly(dodecyl methacrylate), poly(ethyl methacrylate), poly(2-ethylhexyl methacrylate), poly(n-hexyl methacrylate), poly(phenyl methacrylate), poly(n-propyl methacrylate), poly(octadecyl methacrylate), poly(1,1-dihydropentadecafluorooctyl methacrylate), poly(heptafluoroisopropyl methacrylate), poly(heptadecafluorooctyl methacrylate), poly(1-hydrotetrafluoroethyl methacrylate), poly(1,1-dihydrotetrafluoropropyl methacrylate), poly(1-hydrohexafluoroisopropyl methacrylate), and poly(t-nonafluorobutyl methacrylate); and polyesters such a poly(ethylene terephthalate), poly(butylene terephthalate), and poly(ethylene terenaphthalate).

The term "polyolefin" is used herein to mean a polymer prepared by the addition polymerization of one or more unsaturated monomers which contain only carbon and hydrogen atoms. Examples of such polyolefins include polyethylene, polypropylene, poly(1-butene), poly(2-butene), poly(1-pentene), poly(2-pentene), poly(3-methyl-1-pentene), poly(4-methyl-1-pentene), and the like. In addition, such term is meant to include blends of two or more polyolefins and random and block copolymers prepared from two or more different unsaturated monomers. Because of their commercial importance, the most desired polyolefins are polyethylene and polypropylene.

The term "aqueous medium" is used herein to mean any liquid medium of which water is a major component. Thus, the term includes water per se and aqueous solutions. The aqueous medium also may contain organic solvents which are soluble in water, i.e., "polar solvents." For example, the aqueous medium may be a liquid bodily discharge, such as urine, menses, and saliva.

As used herein, the term "hydrophobic vinyl polymer" is meant to include any hydrophobic vinyl polymer which is surface active in a polar nonaqueous solvent. Desirably, the hydrophobic vinyl polymer will have readily hydrolyzable pendant groups. Thus, the term "hydrophobic vinyl polymer having readily hydrolyzable pendant groups" is used herein to mean any hydrophobic vinyl polymer having pendant groups which may be removed by acid- or base-catalyzed hydrolysis in an aqueous medium to give a hydrophilic vinyl polymer. Examples of hydrophobic vinyl polymers having readily hydrolyzable pendant groups include, by way of illustration, poly(vinyl trifluoroacetate), poly(vinyl t-butyrate), and poly(vinyl t-butyl ether).

The term "hydrophilic vinyl polymer" is meant to include any vinyl polymer which, when present on the surface of a hydrophobic polymer substrate, permits the substrate to be wet by water. Thus, the presence of a hydrophilic vinyl polymer coating on the substrate renders the substrate wettable. Examples of hydrophilic vinyl polymers include, by way of example only, poly(vinyl alcohol), poly(acrylamide), poly(hydroxymethacrylamide), poly(hydroxethyl methacrylate), and poly(hydroxyethyl acrylate).

As used herein, the term "polar nonaqueous solvent" means any organic solvent which is sufficiently polar to be soluble in or miscible with water and which, when used as a solvent for a hydrophobic vinyl polymer, causes or permits such hydrophobic vinyl polymer to become a surface-active agent. That is, the solution of the hydrophobic vinyl polymer in a polar nonaqueous solvent spontaneously wets the surface of a hydrophobic polymer substrate. Examples of polar nonaqueous solvents include, by way of illustration, methanol, ethanol, 1-propanol, 2-propanol, 1,3-dioxane, 1,4-dioxane, tetrahydrofuran, 1-methyl-2-pyrrolidinone, N,N-dimethylformamide, dimethyl sulfoxide, dimethylacetamide, acetone, acetonitrile, ethanolamine, formic acid, nitro-methane, and pyridine.

As stated earlier, the method of the present invention involves preparing a solution of a hydrophobic vinyl polymer in a polar nonaqueous solvent in which the hydrophobic vinyl polymer is surface-active. A substrate composed, in whole or in part, of a hydrophobic polymer then is treated with the solution under conditions sufficient to deposit the hydrophobic vinyl polymer on the substrate. In general, treating may be carried out at a temperature of from ambient temperature (i.e., about 25° C.) to the boiling point of the polar nonaqueous solvent. Desirably, treatment will be carried out at a temperature of at least about 50° C. More desirably, treatment will be carried out at a temperature which is above the softening temperature of the hydrophobic polymer. The use of the higher treatment temperatures results in the deposition of a coating which is durable, i.e., which resists removal by, for example, 2-propanol or a nonionic surfactant.

The hydrophobic vinyl polymer desirably will have readily hydrolyzable pendant groups. An example of such a polymer is poly(vinyl trifluoroacetate). However, any hydrophobic vinyl polymer having readily hydrolyzable pendant groups in general may be employed. However, such hydrophobic vinyl polymer must be surface active in a polar nonaqueous solvent.

Desirably, the hydrophobic vinyl polymer having readily hydrolyzable pendant groups is capable of being hydrolyzed under mild conditions to give a hydrophilic vinyl polymer, such as poly(vinyl alcohol). As used herein, the term "mild conditions" generally refers to aqueous solutions of an acid or a base at a temperature of from about ambient temperature (about 25° C.) to about 100° C., in which the concentration of the acid or base is no more than about 1 N. For example, the concentration of the acid or base may be no more than about 0.5 N. The minimum concentration is that which is required to effect the desired hydrolysis. Such minimum concentration will vary, depending upon the acid or base and the temperature at which hydrolysis is to be carried out. In general, treating may be carried out at a temperature of from ambient temperature (i.e., about 25° C.) to the boiling point of the polar nonaqueous solvent. Desirably, treatment will be carried out at a temperature of at least about 50° C. More desirably, treatment will be carried out at a temperature which is above the softening temperature of the hydrophobic polymer.

Desirably, the acid or base will be a strong acid or base. Examples of strong acids include, by way of illustration only, hydrochloric acid, sulfuric acid, p-toluene-sulfonic acid, chloroacetic acid, and trifluoroacetic acid. Examples of strong bases include, also by way of illustration only, alkali metal hydroxides, such as sodium hydroxide and potassium hydroxide, and ammonium hydroxide.

The present invention is further described by the example which follows. Such example, however, is not to be construed as limiting in any way either the spirit or the scope of the present invention.

EXAMPLE

Synthesis of Poly(vinyl trifluoroacetate)

Poly(vinyl trifluoroacetate) was prepared by alkoxy-deacyloxy-substitution using trifluoroacetic anhydride and poly(vinyl alcohol). Trifluoroacetic anhydride was obtained from Aldrich Chemical Company (Milwaukee, Wis.). The poly(vinyl alcohol) employed was Airvol® 125, a product of Air Products and Chemicals, Inc. (Allentown, Pa.). The polymer is reported to have a weight-average molecular weight of 80,000.

A 0.35 g sample of poly(vinyl alcohol) was placed in a round bottom flask; the flask was fitted with a reflux condenser. Approximately 50 ml of N,N-dimethylformamide was added to the flask and the resulting mixture was heated at the reflux temperature of the solvent (153° C.). The poly(vinyl alcohol) dissolved in the hot solvent. Upon cooling the mixture to room temperature, the solution became turbid. The mixture was further cooled to 0° C. and 1.7 ml of trifluoroacetic anhydride was added dropwise. The poly (vinyl alcohol/dimethylformamide reaction mixture became clear. The fluorinated polymer was precipitated in water. The precipitate was washed with deionized water until the rinse water exhibited a neutral pH. The precipitate then was dried under reduced pressure at 60° C. for 60 min.

The precipitate was white in color and appeared to be fibrous. An infrared spectrum of the material was collected on a Nicolet 710 Fourier transform infrared spectrophotometer (Nicolet Instruments, Madison, Wis.). The spectrum was consistent with a trifluoroacetate ester. Although a 50 percent mole excess of the anhydride (based on the reported molecular weight of the polymer) was used in the esterification step, no measurement was made of the degree of esterification.

Surface Activity of Poly(vinyl trifluoroacetate)

The surface tension of poly(vinyl trifluoroacetate) in 1-methyl-2-pyrrolidinone was compared to the surface tensions of pure solvent and solutions of poly(vinyl acetate) and poly(vinyl alcohol) in the solvent. The surface tensions were measured by the du Nouy Ring Method using a Fisher Scientific Model 20 Tensiometer (Fisher Scientific, Atlanta, Ga.). All surface tensions are averages of a minimum of 10 observations. The surface tensions were not corrected according to the method of Harkins and Jordan; the relative differences in surface tension are of greater significance than the actual surface tensions of the nonaqueous solutions. The surface tensions and solution concentrations are reported in Table 1.

TABLE 1

Surface Tensions of
1-Methyl-2-Pyrrolidinone/Polymer Solutions

| | | Surface Tension |
| --- | --- | --- |
| Solute | Conc. (mg/ml) | (dyne/cm) |
| None | — | 42.3 |
| Poly(vinyl acetate) | 2.83 | 41.9 |
| Poly(vinyl alcohol) | 16.9 | 42.0 |
| Poly(vinyl trifluoroacetate) | 2.33 | 32.4 |

The data in Table 1 clearly reveal a significant decrease, about 23 percent, in the surface tension of the solvent as a result of the addition of the poly(vinyl trifluoroacetate). In contrast, the solutions of poly(vinyl acetate) and poly(vinyl alcohol) display no change in surface tension relative to the pure solvent. The decrease in surface tension observed for the poly(vinyl trifluoroacetate) solution indicates that the polymer is surface active in this solvent.

Coating Deposition and Analysis

Coatings on films were prepared by immersing polypropylene film samples in 1-methyl-2-pyrrolidinone solutions summarized in Table 1. Typical coating deposition conditions are disclosed below. The polypropylene film used in this study was a 2-mil (about 0.05 mm), Type XP715S/P, Lot 46805 film supplied by Edison Plastics Co. (Newport News, Va.). Film was chosen as a model substrate because of the ease of analysis of coated films. Polypropylene was selected because of the commercial importance of the polymer.

The coated films were analyzed by water contact angle and electron spectroscopy for chemical analysis (ESCA). Contact angle measurements were made using a Rame-Hart Model 100-06 NRL Contact Angle Goniometer. The contact angle was taken as the line tangent to the edge of a fluid droplet in contact with the substrate surface. The contact angle values were derived by averaging the observations taken from a minimum of three droplets. Droplets were examined alternately at the left and right fluid contact points for a total of three times each. Thus, the contact angle reported herein are the averages of 18 individual observations; the errors reported represent one standard deviation of these observations. All ESCA measurements were obtained with a Perkin-Elmer Phi 5000LS ESCA Spectrometer. The instrument configuration was as follows: achromatic magnesium source operating at 400 watts; analysis region, 1 mm×3 mm; and all spectra were collected at an analyzer pass energy of 178.950 eV. The spectral region examined ranged from 0 eV to 1100 eV binding energy. The surface composition data reported in the tables below does not include trace impurities like nitrogen and silicon which typically totaled less than 2 atom percent.

Poly(vinyl trifluoroacetate) and Poly(vinyl acetate) Coatings

The depositions of coatings of poly(vinyl trifluoroacetate) and poly(vinyl acetate) films on the polypropylene film were accomplished by simple immersion of the film in an 1-methyl-2-pyrrolidinone solution of the appropriate polymer. Immersion typically lasted 10 to 15 sec. The film then was rapidly removed from the solution. The films were blotted dry, rinsed with pure solvent to remove excess or nonadsorbed coating polymer from the film surface, and blotted dry. Typically, the polymer solutions used for immersion were maintained at room temperature (about 25° C.). However, several poly(vinyl trifluoroacetate) coatings were deposited using solutions at elevated temperatures, i.e., 90–95° C. and 100–105° C. Table 2 lists the contact angle and ESCA data for the as-deposited coatings. In this and subsequent tables, PVAC represents poly(vinyl acetate) and PVTFAC represents poly(vinyl trifluoroacetate).

TABLE 2

Contact Angle and ESCA Data for As-Deposited Films

| Coating Polymer | Contact Angle | Surface Atomic Composition[a] | | |
|---|---|---|---|---|
| | | Carbon | Oxygen | Fluorine |
| None | 96 ± 4° | 100 | ND[b] | ND |
| PVAC | 96 ± 1° | 99.7 | 0.3 | ND |
| PVTFAC | 92 ± 2 | 48.4 | 20.2 | 31.4 |

[a]In atom percent.
[b]Not detected.

The water contact angle does not discriminate between the noncoated and coated films. This was expected due to the hydrophobic nature of both the substrate polymer and the coatings. However, the ESCA analysis clearly indicates the deposition of the fluorinated polymer as a coating. The F/C atomic ratio measured experimentally is 0.65. This is very near the calculated value of 0.75, based on the stoichiometry of poly(vinyl trifluoroacetate). The experimental O/C ratio is 0.67. This ratio, too, is consistent with the stoichiometry of a coating on the film. Notably, ESCA analysis of the film treated with poly(vinyl acetate) indicates that no deposition occurred. This is consistent with the absence of surface activity observed for this solute in the 1-methyl-2-pyrrolidinone solution (see Table 1).

Hydrolysis of Deposited Coatings

Samples of the polypropylene film coated with poly(vinyl trifluoroacetate) and films of attempted coatings with poly(vinyl acetate) were treated with aqueous 0.1 N sodium hydroxide or potassium hydroxide solution to effect the hydrolysis of the coating polymer. Typically, coated films were immersed in the caustic solution for 30 sec. The caustic solution was maintained at 25° C., 68° C., or 75° C. After hydrolysis, coated films were triple rinsed with copious amounts of water in an effort to remove weakly bound materials from the film surface. ESCA and contact angle data obtained from the hydrolyzed films are presented in Table 3.

TABLE 3

Contact Angle and ESCA Data for Hydrolyzed Films

| Coating Polymer | Contact Angle | Surface Atomic Composition[a] | | |
|---|---|---|---|---|
| | | Carbon | Oxygen | Fluorine |
| None | 96 ± 4° | 100 | ND[b] | ND |
| NaOH-Hydrolyzed PVAC (25° C.) | 96 ± 1° | 98.9 | 0.9 | ND |
| NaOH-Hydrolyzed PVTFAC (25° C.) | 62 ± 1° | 86.6 | 12.9 | 0.5 |
| NaOH-Hydrolyzed PVTFAC (68° C.) | NM[c] | 86.7 | 12.9 | ND |
| NaOH-Hydrolyzed PVTFAC (75° C.) | 68 ± 9° | 87.6 | 11.9 | ND |
| KOH-Hydrolyzed PVTFAC (25° C.) | 62 ± 1° | 92.4 | 7.4 | 0.1 |

[a]In atom percent.
[b]Not detected.
[c]Not measured.

Analysis of the polypropylene film with the attempted coating of poly(vinyl acetate) after hydrolysis further corroborates observations made previously on the as-deposited films. The lack of surface activity of poly(vinyl acetate) in 1-methyl-2-pyrrolidinone results in no adsorption of the polymer as a coating on the film.

Hydrolysis of the poly(vinyl trifluoroacetate) coating on the film occurs very readily. Note that after a 30-second treatment with the sodium hydroxide solution at 25° C. the hydrolysis was essentially complete. The coating was converted from hydrophobic to hydrophilic as evidenced by the significant decrease in the water contact angle (namely, from 92° C. to 62° C.). ESCA analysis of the hydrolyzed coating also reveals complete hydrolysis at 25° C. The experimental O/C ratio is 0.15. The theoretical O/C ratio expected for a stoichiometric coating of poly(vinyl alcohol) is 0.5. This assumes that the coating thickness is greater than the analysis depth of the ESCA procedure, which generally is accepted as about 10 nanometers. The experimental O/C ratio of 0.15 is consistent with a thin, possibly monolayer or partial monolayer coating on the film surface. The contact angle and ESCA data together suggest that the coating is nominally macroscopically uniform in thickness and composition over the entire treated film surface.

The data presented in Tables 2 and 3 clearly demonstrate the utility of the method of the present invention. The poly(vinyl trifluoroacetate) was readily deposited and hydrolyzed, yielding a hydrophilic surface coating on the hydrophobic polypropylene surface. In contrast, attempts to coat a hydrophobic substrate with poly(vinyl acetate) failed to produce any useful change in the surface composition of the substrate.

Durability of Coated Materials

The durability of the poly(vinyl trifluoroacetate) coating on polypropylene film was investigated by washing the coated films with either 2-propanol or an aqueous solution of an ethoxylated nonylphenol (Triton® X-102, Rohm & Haas Company).

Durability to 2-Propanol Wash

A sample of film was prepared by the immersion technique described above. The coating was hydrolyzed with 0.1 N aqueous sodium hydroxide at 25° C. After hydrolysis, the coated film was washed by immersion in 2-propanol for 60 seconds and triple rinsed with deionized water. The film was dried under ambient conditions. Table 4 is a comparison of water contact angle and ESCA data for the 2-propanol washed, film having the hydrolyzed coating with the hydrolyzed coating film prior to washing.

TABLE 4

Contact Angle and ESCA Data for Hydrolyzed Films Before and After 2-Propanol Washing

| Film Sample | Content Angle | Surface Atomic Composition[a] | | |
| --- | --- | --- | --- | --- |
| | | Carbon | Oxygen | Fluorine |
| Before washing | 62 ± 1° | 86.6 | 12.9 | 0.5 |
| After washing | 58 ± 8° | 83.2 | 16.5 | 0.3 |

[a]In atom percent.

The data of Table 4 clearly indicate that the hydrolyzed coating is resistant to removal by 2-propanol.

Durability to Surfactant Wash

The durability of the coating was further investigated by washing films with a 0.5 percent by weight aqueous solution of Triton® X-102. In this case, both the poly(vinyl trifluoroacetate)-coated film and the hydrolyzed poly(vinyl trifluoroacetate)-coated film were tested for durability. The washing was performed as described above, except the Triton® X-102 solution was used in place of 2-propanol. The results of these wash experiments are summarized in Table 5.

TABLE 5

Contact Angle and ESCA Data for Poly(vinyl trifluoroacetate) Polypropylene Films Subjected to Triton X102 Washing

| Film Sample | Contact Angle | Surface Atomic Composition[a] | | |
| --- | --- | --- | --- | --- |
| | | Carbon | Oxygen | Fluorine |
| Coated at 25° C., hydrolyzed at 25° C. | 62 ± 1° | 86.6 | 12.9 | 0.5 |
| Coated at 25° C., hydrolyzed at 25° C., washed | 98 ± 1° | 92.1 | 2.2 | ND[b] |
| Coated at 25° C., hydrolyzed at 95° C., washed | 79 ± 6° | 91.7 | 5.8 | ND[b] |
| Coated at 95° C., hydrolyzed at 25° C., washed | 76 ± 7° | 91.8 | 6.4 | 0.2 |
| Coated at 95° C., washed | 97 ± 1° | 71.2 | 11.7 | 17.0 |

[a]In atom percent.
[b]Not detected.

The data of Table 5 indicate that washing with an aqueous solution of Triton® X-102 was aggressive enough to remove the room temperature-deposited and hydrolyzed poly(vinyl trifluoroacetate) coating. However, the coating was rendered durable to this wash treatment if either the initial deposition or the hydrolysis was performed at 95° C. Notably, 95° C. is above the softening temperature of the polypropylene film substrate.

While the specification has been described in detail with respect to specific embodiments thereof, it will be appreciated that those skilled in the art, upon attaining an understanding of the foregoing, may readily conceive of alterations to, variations of, and equivalents to these embodiments. For example, the present invention contemplates using any hydrophobic vinyl polymer having readily hydrolyzable pendant groups which is surface active in a polar nonaqueous solvent and which, upon hydrolysis, provides a hydrophilic vinyl polymer. As another example, the substrate may be any shaped article which is formed, in whole or in part, of a hydrophobic polymer. As a further example, the hydrophobic vinyl polymer may have both readily hydrolyzable pendant groups and pendant hydroxy or carboxy groups, provided, of course, that such polymer is surface active in a polar nonaqueous solvent. The polymer may be prepared, for example, as described in the Example, except that less than a stoichiometric amount of the anhydride is employed. A hydrophobic polymer substrate may be coated with such polymer and the coating crosslinked by means of the free hydroxy or carboxy groups by known means. The crosslinked coating then may be hydrolyzed as described in the Example.

What is claimed is:

1. A coated substrate, composed of a hydrophobic polymer, having on the surface thereof a uniform coating of a hydrophobic vinyl polymer, the coated substrate being prepared by the method comprising:

dissolving a hydrophobic vinyl polymer in a polar nonaqueous solvent in which the hydrophobic vinyl polymer is surface-active;

immersing the substrate in the solution at a temperature of from about 25° C. to the boiling point of the solvent to deposit the hydrophobic vinyl polymer on the substrate as a monolayer or partial monolayer coating which is nominally macroscopically uniform in thickness and composition over the entire surface of the substrate;

removing the coated substrate from the hydrophobic polymer solution; and rinsing the coated substrate with a polar nonaqueous solvent.

2. The coated substrate of claim 1, in which the coated substrate is prepared by the method which further comprises drying the rinsed substrate.

3. The coated substrate of claim 1, in which the coated substrate is prepared by the method in which immersing is carried out at a temperature of from about 50° C. to the boiling point of the polar nonaqueous solvent.

4. The coated substrate of claim 1, in which the coated substrate is prepared by the method in which immersing is carried out at a temperature which is above the softening point of the hydrophobic polymer.

5. The coated substrate of claim 1, in which the coated substrate is prepared by the method in which the hydrophobic vinyl polymer is poly(vinyl trifluoroacetate).

6. The coated substrate of claim 1, in which the coated substrate is prepared by the method in which the polar nonaqueous solvent is 1-methyl-2-pyrrolidinone.

7. The coated substrate of claim 1, in which the coated substrate is prepared by the method in which the substrate is selected from the group consisting of films, fibers, and nonwoven webs.

8. The coated substrate of claim 1, in which the coated substrate is prepared by the method in which the substrate is a nonwoven web.

9. The coated substrate of claim 8, in which the coated substrate is prepared by the method in which the substrate is a meltblown nonwoven web.

10. The coated substrate of claim 8, in which the coated substrate is prepared by the method in which the substrate is a spunbonded nonwoven web.

11. The coated substrate of claim 1, in which the coated substrate is prepared by the method in which the hydrophobic polymer is a polyolefin.

12. The coated substrate of claim 11, in which the coated substrate is prepared by the method in which the polyolefin is polyethylene or polypropylene.

* * * * *